(12) United States Patent
Hazlett et al.

(10) Patent No.: US 8,558,140 B2
(45) Date of Patent: Oct. 15, 2013

(54) HEATED HAND GRIPS

(75) Inventors: James C. Hazlett, Delevan, WI (US); Richard W. Fitzgerald, Franklin, WI (US); Manuel Anaya Perea, Chihuahua (MX)

(73) Assignee: ZF Friedrichshafen AG, Friedrichshafen (DE)

( * ) Notice: Subject to any disclaimer, the term of this patent is extended or adjusted under 35 U.S.C. 154(b) by 1472 days.

(21) Appl. No.: 12/185,374

(22) Filed: Aug. 4, 2008

(65) Prior Publication Data

US 2009/0065491 A1  Mar. 12, 2009

Related U.S. Application Data

(60) Provisional application No. 60/970,657, filed on Sep. 7, 2007.

(51) Int. Cl.
*B60L 1/02* (2006.01)

(52) U.S. Cl.
USPC ............ 219/204; 219/202; 74/527; 74/551.1; 74/551.9

(58) Field of Classification Search
USPC .............. 74/551.1–551.9, 527; 219/202, 204, 219/466.1
See application file for complete search history.

(56) References Cited

U.S. PATENT DOCUMENTS

| | | | |
|---|---|---|---|
| 3,852,570 A * | 12/1974 | Tyler | 219/528 |
| 4,471,209 A | 9/1984 | Hollander | |
| 4,848,502 A * | 7/1989 | Kikuta et al. | 180/179 |
| 4,882,466 A * | 11/1989 | Friel | 219/219 |
| 4,937,429 A | 6/1990 | Hollander | |
| 5,155,878 A * | 10/1992 | Dellis | 16/421 |
| 5,862,715 A * | 1/1999 | Lemire | 74/553 |
| 6,055,882 A | 5/2000 | Arbeiter | |
| 6,844,524 B2 | 1/2005 | Downey et al. | |
| 6,927,367 B2 * | 8/2005 | Livingstone | 219/490 |
| 6,984,807 B2 * | 1/2006 | Richlen | 219/204 |
| 6,998,576 B2 * | 2/2006 | Marquis | 219/204 |
| 7,010,997 B2 | 3/2006 | Dzurnak | |
| 7,091,450 B1 | 8/2006 | Hollander | |
| 7,119,304 B2 | 10/2006 | Meyers | |
| 7,189,943 B2 | 3/2007 | Richlen | |
| 7,214,906 B1 | 5/2007 | Hansen et al. | |
| 2003/0183620 A1 * | 10/2003 | Wong | 219/549 |

(Continued)

FOREIGN PATENT DOCUMENTS

| | | |
|---|---|---|
| DE | 20 2005 021031 | 12/2006 |
| EP | 0727348 | 8/1996 |
| EP | 1445984 | 8/2004 |

OTHER PUBLICATIONS

International Search Report for PCT/US2008/072805, filed Apr. 8, 2008 mailed Feb. 23, 2009.

*Primary Examiner* — Henry Yuen
*Assistant Examiner* — John Wasaff
(74) *Attorney, Agent, or Firm* — David W. Okey LLC

(57) ABSTRACT

Heated hand grips for motorcycles or other applications, such as snowmobiles, are disclosed. The hand grips enable better control and comfort for the user. The hand grips described herein have a better design for mounting on the handle bars, allowing for a better seal against ingress of moisture and for sturdier mounting of the control circuitry. The control circuitry itself is simplified, and the control knob has built-in detents for more tactile feedback to the user. The heated elements themselves include a temperature sensor for simplified wiring and immediate feedback.

24 Claims, 9 Drawing Sheets

(56) References Cited

U.S. PATENT DOCUMENTS

| | | |
|---|---|---|
| 2004/0007567 A1 | 1/2004 | Downey |
| 2004/0011777 A1* | 1/2004 | Richlen ................. 219/204 |
| 2004/0069089 A1* | 4/2004 | Chen ..................... 74/502.2 |
| 2004/0107789 A1* | 6/2004 | Peppard ................. 74/484 R |
| 2005/0103769 A1* | 5/2005 | Marquis ................ 219/204 |
| 2006/0169096 A1* | 8/2006 | Barnett ................. 74/551.8 |
| 2007/0157902 A1* | 7/2007 | Possehl et al. ........ 123/400 |
| 2007/0182514 A1* | 8/2007 | Brandl et al. .......... 335/37 |

* cited by examiner

HEATED HAND GRIPS

BACKGROUND

The field of the invention is that of heated hand grips generally, and in particular, heated hand grips for motorcycles, snow mobiles, and other vehicles having a source of power and intended for use in cold weather in the out-of-doors.

When users operate motorcycles or snowmobiles in cold weather, their hands get cold, even with warm clothing. The heat transfer from a limb extension like a foot or a hand makes it very difficult to keep warm. It is important that a person operating such a vehicle concentrate on driving, rather than on physical needs. If the hands become too cold, they can become numb, and the person may not be able to operate the vehicle. In a worst case, frostbite or other injury could result from prolonged exposure. As a result, heated hand grips have been used for such vehicles.

There are problems with the heated hand grips that have been used to date. For example, in U.S. Pat. No. 4,471,209, an early invention, uses a grip heater with an electrical heating element comprising a resistive wire wrapped over a tubular insulator with a pair of helical recesses in which the heating element resides. A soft, grippable rubber outer surface then covers the wire. However, early control systems, such as those in this patent, offered only "low" and "high" settings, which was provided by two different heating elements. These early heaters, however, tended to suffer one or more breaks in the resistive wire used for the heating, and thus were not satisfactory.

Another grip heater is depicted in U.S. Pat. No. 7,010,997. This patent discloses a heating grip for the right-side handle bar, that is, the throttle grip. The heater requires separate cables and connectors to the vehicle battery or other power source. After entering the motorcycle grip, the heating coils form a large spiral transverse to the axis of the handle bar. As the user rotates the throttle grip backward or forward, the spiral will provide slack to prevent stressing the connecting end of the heater wire. While providing a heater to the right-side handle bar, this solution will also require an equal number of wires and connectors for the left hand grip. In addition, no control system is mentioned for controlling the temperature of the grips and preventing thermal runaway.

Another effort is shown in U.S. Pat. No. 7,091,450, which again features two different heating elements, this time placed into helical recesses in a tubular support for the hand grips. Whatever its supposed improvement in reliability, this grip heater has high costs, resulting from the extensive preparation of tubular supports with their helical grooves. In addition, cross-over points for the heating elements are preferably isolated electrically from one another, requiring small insulating pads and the labor to install the pads and place the wires so that they do not contact each other. Instead of the small pads, the tubular support may instead use small crossover protrusions, similar to wire grips, to insure that the crossing wires will not touch each other. These cross-over points will eventually become stress-risers for the wire, which will strain and eventually break at some of the cross-over points.

Still another example is seen in U.S. Pat. No. 7,214,906. This patent discloses a very complicated control system for independent control of both left and right hand grips. The system is sufficiently complicated that it requires a microprocessor controller and a memory. The microprocessor requires a control panel and is equipped with flashing LEDs, up and down buttons, and individual left and right buttons. The control panel must be placed somewhere accessible to the user, adding to the clutter on the motorcycle controls. The control system is very complicated, but does not provide for closed-loop thermal compensation of the grip temperature. The patent provides few details of the actual heated hand grips themselves. At a minimum, this system disclosed will not help manufacturers of motorcycles or heated hand grips control costs.

What is needed is a less complicated, more reliable heating grip for cold weather, outdoor vehicle, such as motorcycles or snowmobiles.

SUMMARY

A first embodiment is a heated hand grip. The heated hand grip includes an inner insulated housing having a mounting aperture and an interface, a printed circuit board for mounting within the housing and including a potentiometer for mounting in the mounting aperture and directly to the printed circuit board, a bezel configured for mounting to a handlebar and also configured for mounting to the inner housing, a control knob for mounting to the bezel, a resistive heating element for at least one hand grip operatively connected to the printed circuit board, and a control circuit mounted on the printed circuit board for controlling power to the resistive heating element.

Another embodiment is a heated hand grip. The heated hand grip includes an inner insulated housing having a mounting aperture and an interface, a printed circuit board for mounting within the housing, a bezel configured for mounting to a handlebar and also configured for mounting to the inner housing, a control knob for mounting to the bezel, wherein the bezel and the knob further comprise a detent mounted for providing a tactile feedback to a user, a resistive heating element mounted to at least one hand grip and operatively connected to the printed circuit board, and a control circuit mounted on the printed circuit board for controlling power to the resistive heating element.

Another embodiment is a heated hand grip. The heated hand grip includes an inner insulated housing having a mounting aperture, an interface, and an inner shelf, a printed circuit board for mounting within the housing on the shelf, a bezel configured for mounting to a handlebar and also configured for mounting to the inner housing, a control knob for mounting to the bezel, wherein the bezel and the knob further comprise a detent mounted for providing a tactile feedback to a user, a resistive heating element mounted to at least one hand grip and operatively connected to the printed circuit board, and a control circuit mounted on the printed circuit board for controlling power to the resistive heating element.

Another embodiment is a heated hand grip. The heated hand grip includes an inner housing having a mounting aperture and an interface, a printed circuit board for mounting within the housing, a bezel configured for mounting to a handlebar and also configured for mounting to the inner housing, a control knob for mounting to the bezel, wherein the bezel and the knob further comprise a detent mounted for providing a tactile feedback to a user, a resistive heating element mounted to at least one hand grip and operatively connected to the printed circuit board, and a control circuit mounted on the printed circuit board for controlling power to the resistive heating element, wherein the control knob, the bezel and the inner housing further comprise mounts for a first seal and a second seal, a first mount adjacent the control knob and the bezel and a second mount adjacent the bezel and the inner housing, wherein the control knob, the first seal, the bezel, the second seal and the inner housing form a tortuous path for moisture ingress.

Another embodiment is a method of heating a hand grip. The method include steps of providing a heating pad that includes heating element traces mounted on a thin polymer film, the film optionally reinforced with fiberglass, the heating pad mounted within the hand grip. The method also includes steps of connecting the heating pad to a control circuit, connecting a temperature sensor to the control circuit, heating the heating pad with the control circuit, and regulating a flow of power to the heating pad using the temperature sensor.

Additional features and advantages are described herein, and will be apparent from, the following Detailed Description and the figures.

DETAILED DESCRIPTION

Figure 1:
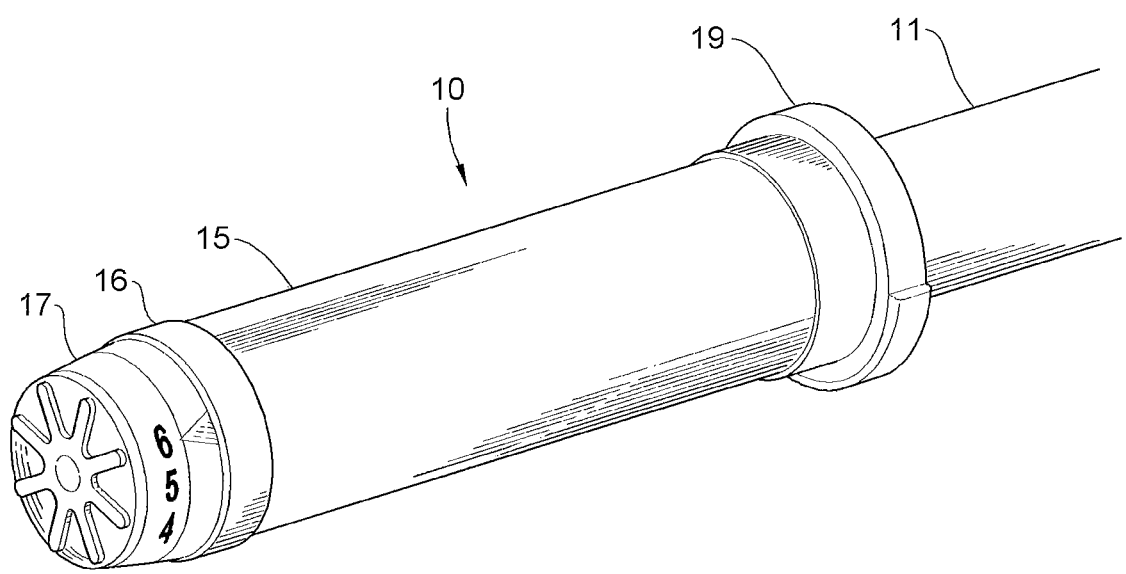
FIG. 1 is a perspective view of an improved hand grip embodiment.

The hand grip embodiments described herein have many advantages over hand grips of the prior art. A first embodiment is shown in FIG. 1. Aside from any performance advantages, the grips, left grip shown, are stylish and clean in their lines. Hand grip 10 is intended for mounting on a handle bar 11, such as a handle bar of a motorcycle or a snowmobile, or other vehicle with locomotion, especially those with a battery and capable of high speeds in cold weather. The handgrip includes an outer grip 15, a mounting bezel 16, and a control knob 17. The hand grip also includes a mounting collar 19 to provide rotational alignment and fixation of the grip to other hand controls on the handle bar. Collar 19 also helps to identify and define the area to be used for placement of the user's hands.

Figure 2:
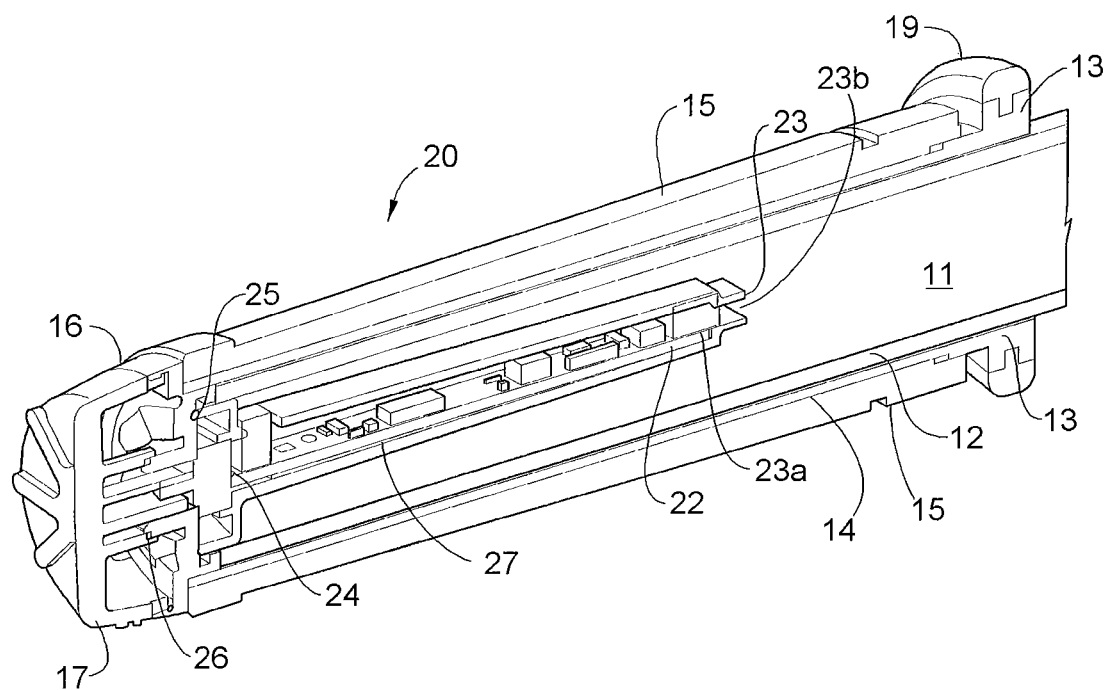
FIG. 2 is a perspective cross-sectional view of the embodiment of FIG. 1.

A perspective, partial cross-section of the left hand grip is depicted in FIG. 2. As seen in the small inset, the hand grip includes several layers. As noted, the outer layer or grip 15 is preferably made from an elastomer or rubber for ease of gripping. Heat or pressure-sensitive adhesives may be used to facilitate bonding of the elastomeric outer layer 15 and the heating element 14. Under the outer layer is a thin flexprint or other heater circuit 14, which will be discussed in detail later. This is followed by an inner molded grip sleeve made of polyamide (nylon) or other suitable thermoplastic or thermoset layer 13. A layer of adhesive 12 secures the inner grip sleeve layer 13 to the heating element 14.

There is only limited space available in the handle bar area and its surroundings for any creature comforts such as hand grip heaters. FIG. 2 shows how it is possible to cleverly mount numerous components in a manner that takes up the least amount of space possible. The hand grip includes a circuit board 22 mounted on an inner housing 23. Inner housing 23 includes a shelf or recess 23a for mounting the circuit board, and a distal aperture 23b for wiring access and egress. The circuit board 22 is preferably mounted with a shock-absorbing layer 27, such as a thin layer of elastomer or an elastomeric adhesive. The proximal end of the housing mounts a potentiometer 24, which is used for controlling a heat setting for the hand grips. The bezel 16 also mounts to the potentiometer, as does the control knob. Two seals or O-rings 25, 26 seal a tortuous path between the outside environment, the control knob, the bezel and the inner housing. This sealing design is intended to add as much resistance as possible to the ingress of water and moisture.

Figure 3:
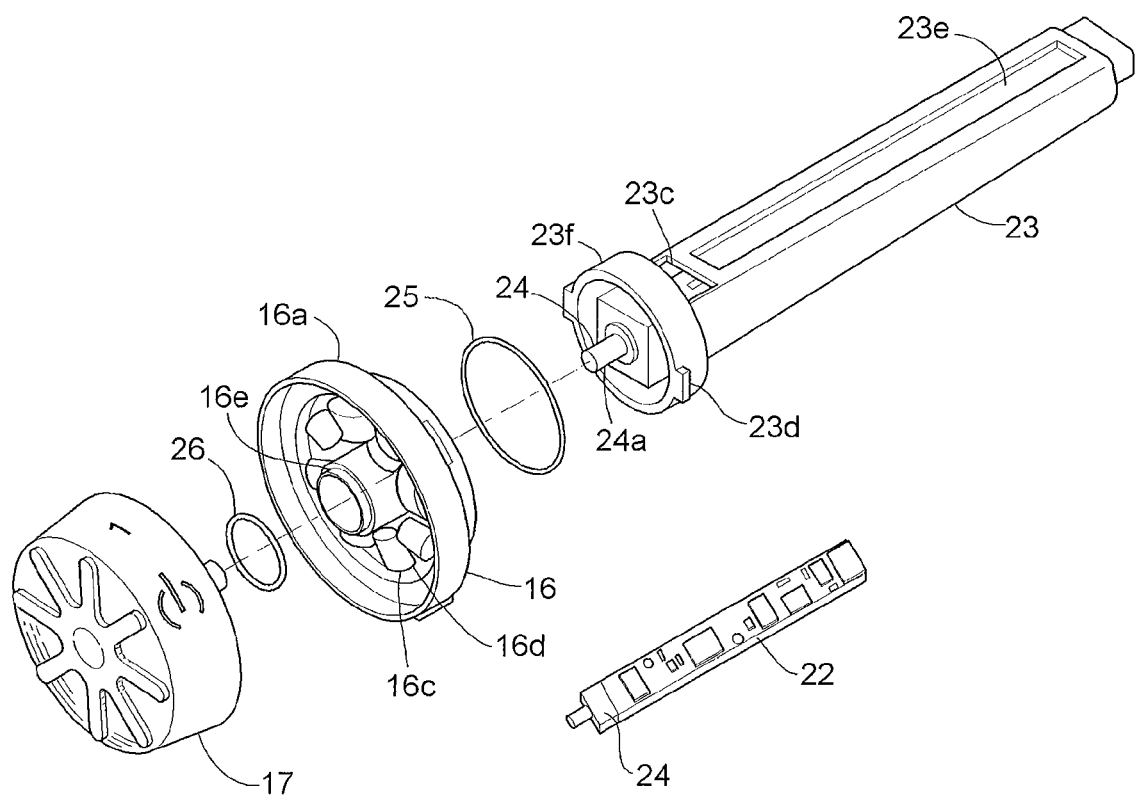
FIG. 3 is an exploded perspective view of the embodiment of FIG. 1.

An exploded view of the hand grip inner portions is disclosed in FIG. 3. In this view, inner housing 23 is seen to have several additional unique features, including an upper aperture 23c for egress of wiring to the flexprint heater, and twist lock ears 23d, for mounting to the bezel. Housing 23 also includes an outer pocket 23e for the wires leading to the heating element and to the mounting pads for the temperature sensor, thermocouple or thermistor, that is mounted on the heating element. The proximal portion or head 23f of housing 23 is a mounting interface to mount housing 23 to bezel 16, discussed below. Note that housing 23 does not completely enclose the circuit board, but rather provides a mount for the circuit board to the handle bar, as well as for wiring to and from the circuit board. Housing 23 might thus be called a mount for the circuit board and for the wiring to and from the circuit board.

Bezel 16 is seen to have an outer diameter 16a and a plurality of raised portions 16c with valleys 16d between the raised portions. These are detent interfaces for the detents described below with respect to the knob. Also depicted are two O-rings 25, 26 for mounting between the knob and the bezel, and between the bezel and the capsule housing. Bezel 16 includes an outer O-ring groove 16e for mounting O-ring 26 (note mating inner groove on control knob boss 17c). Circuit board 22 contains most of the electronic components except for the heating elements themselves, which as noted above, are mounted between the inner and outer portions of the hand grips. Potentiometer 24 is mounted at the proximal end of the circuit board, with potentiometer control turning spindle 24a further extending from the potentiometer housing.

Figure 4A:
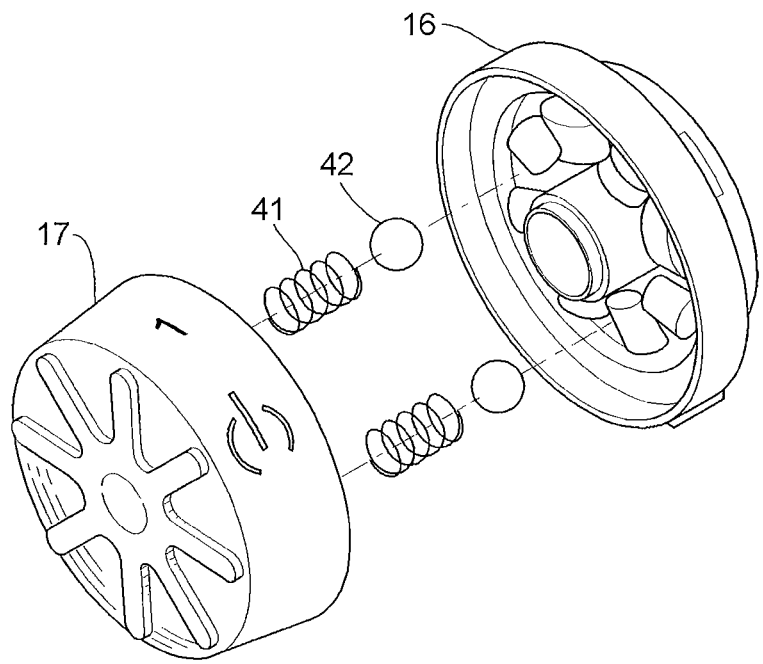
FIGS. 4A and 4B disclose details of a bezel and control knob.
Figure 4B:
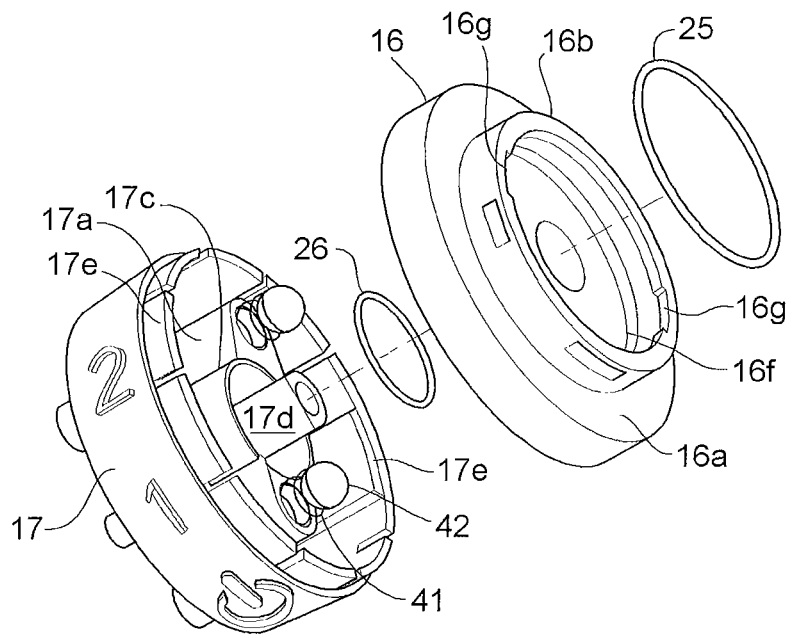

Additional details of the knob and bezel are depicted in FIGS. 4A and 4B. In FIG. 4A, two detents are mounted between bezel 16 and knob 17, each detent including a helical spring 41 and a retaining roller or ball 42. As better seen in FIG. 4B, bezel 16 also includes an inner portion having a smaller diameter 16b with apertures 16g, for entrance and mounting of inner housing 23 mounting ears 23d (see FIG. 3). This portion also includes an inner O-ring groove 16f for sealing between bezel 16 and inner housing 23. FIG. 4B also allows a view of the inner portion of control knob 17. Control knob 17 includes detent mounts 17a, which are molded bosses with cavities for detent springs 41. Detent retaining balls 42 interface between the springs 41 and the mounting features described above on the back side of bezel 16. Control knob outer central boss 17c has an inner groove for receiving and mounting O-ring 26. Control knob inner central boss 17d includes a cavity for interfacing with the control spindle 24a of potentiometer 24. Finally, near the outer diameter of knob 17 are several snap fit levers or arms 17e. These are used to snap fit the control knob onto mating or matching snap fits of the bezel. Other mating features may be used to secure the control knob to the bezel or to the handlebar.

Figure 4C:
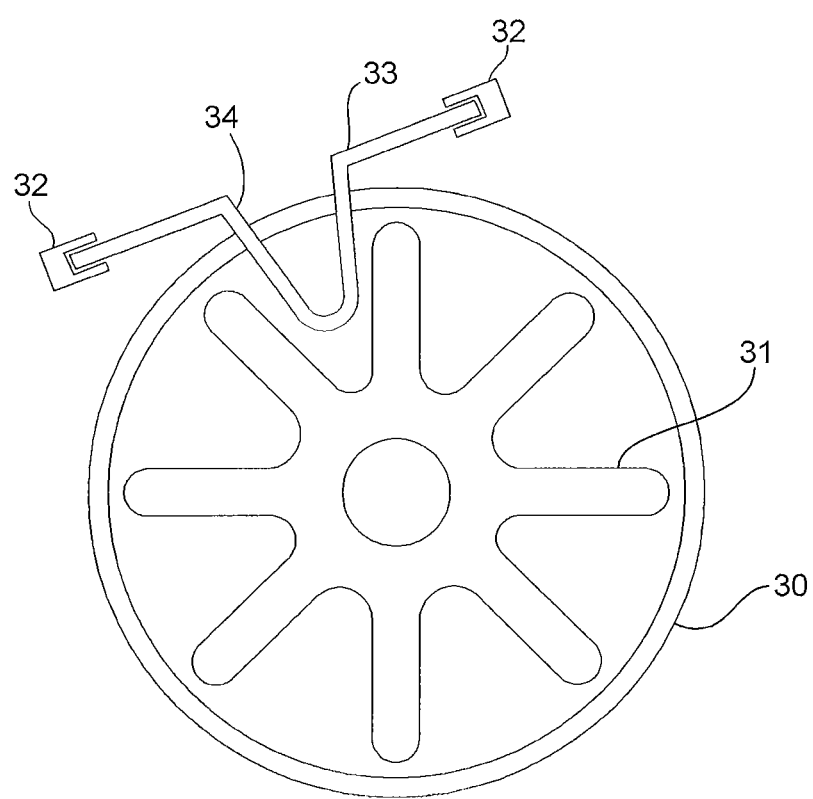
FIG. 4C discloses an alternate detent useful for tactile feedback.

Instead of using springs and retaining balls, other detents may also be used, as shown in FIG. 4C. In this embodiment, control knob 30 includes bosses 31 on its inner surface in the shape of a multi-pointed star, while the bezel includes two mounts 32 for a leaf spring 33 with a V-shape 34 in its center. As the user increases or decreases the heat setting, the knob and the points of the star will click through the V-shaped portion, allowing a user to "count" changes in the control setting. The number of détente points on the star corresponds to the number of setpoints. Thus, this détente embodiment also provides tactile feedback to the user and does not require his or her attention or vision while he or she adjusts the setting. The star and V-shaped spring allow a single point of contact. The springs and balls disclosed above in FIGS. 4A-B allow two points of contact, providing uniform loading and also good tactile feedback.

Figure 5:
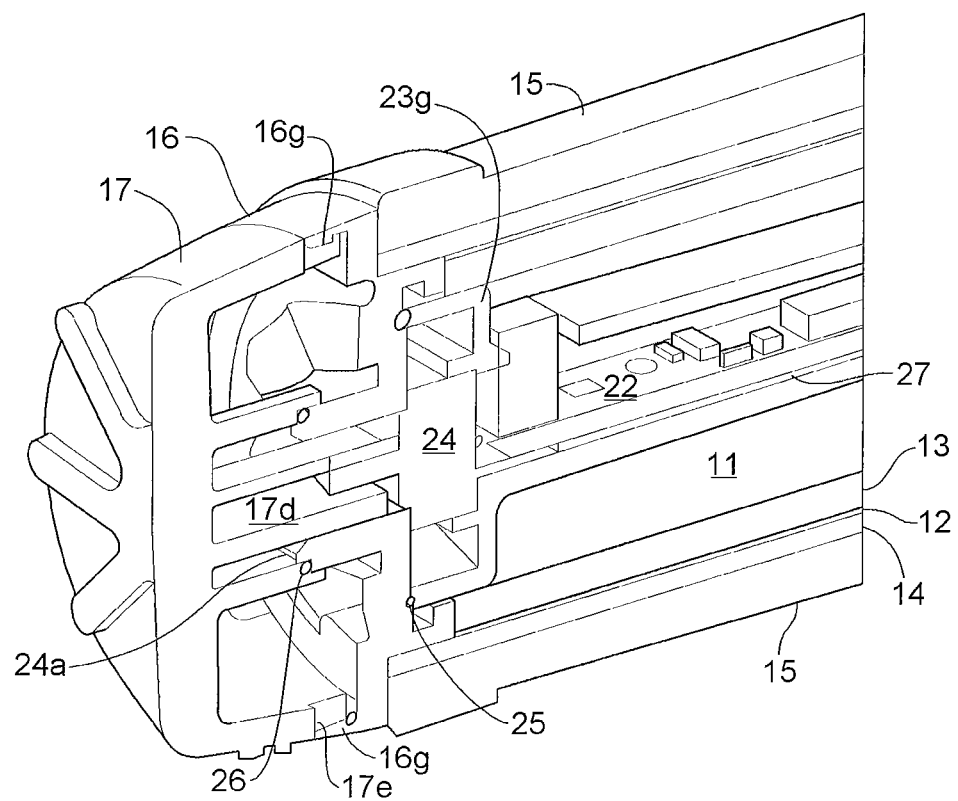
FIG. 5 provides a closer view of the embodiment of FIG. 1.

FIG. 5 presents another close-up perspective view of how the parts of the hand grip interact upon assembly. Inner housing 23 fits inside handle bar 11, supporting circuit board 22. The circuit board 22 is mounted within the housing, and a shock-absorbing layer 27 is provided. The shock absorbing layer may be any relatively flexible, soft material, such as high-density foam, or a thin sheet of elastomer. In one embodiment, a pressure-sensitive, non-permanent acrylic film adhesive is used. A relatively weak adhesive will facilitate removal of the circuit board from the housing.

The potentiometer 24 is mounted on the proximal end of the circuit board, and fits within a boss or mounting aperture 24g on the head of the inner housing. The control knob 24a of the potentiometer 24 fits within a cavity of inner boss 17d of the control circuit control knob 17. Bezel 16 mounts to control knob 17 with snap fits 16g of the bezel interfacing with matching snap fits 17e of the control knob. O-ring 26 provides a seal between the control knob 17 and the bezel 16, while O-ring 25 provides a seal between the bezel 16 and the inner housing 23. O-ring 25 fits grooves 16f on the bezel and a matching groove on the inner housing head 23f. It is desired to prevent the ingress of moisture to the greatest extent possible, because of the deleterious effect of moisture on the heating and control circuits that form a part of the heated hand grip. The design disclosed herein thus provides a tortuous path for the ingress of moisture, helping to minimize the ingress and its effects.

Figure 6:
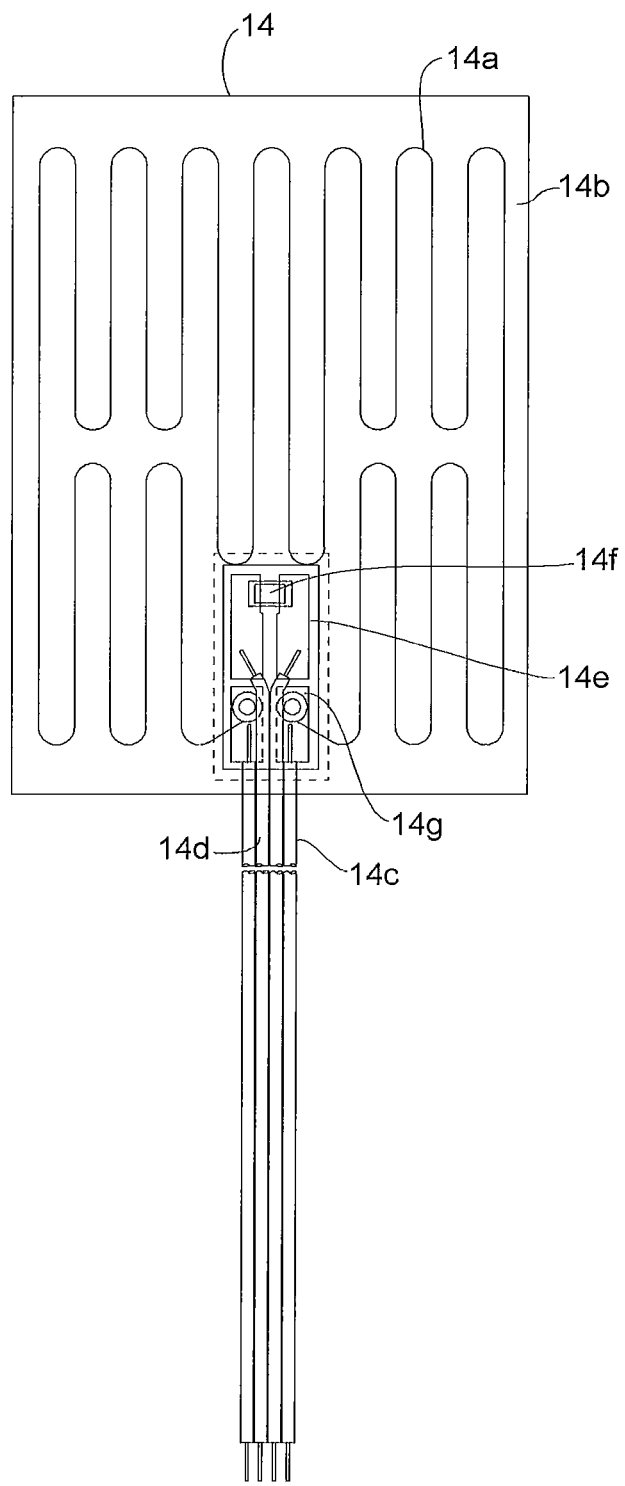
FIG. 6 discloses details of a heating flex circuit useful in the grips.

The flexible heating circuit mentioned above is detailed in FIG. 6. The particular heating pad used herein corresponds to drawing HC0300425XX, Jun. 29, 2007, from Watlow Electric Manufacturing Co., St. Louis, Mo., U.S.A. This flexible heating circuit 14 includes resistive copper heating traces 14a on a pad made from a reinforced fiberglass/epoxy mat 14b. The circuit includes two outer power wires 14c leading from a control circuit to traces 14a, and two inner control wires 14d. The thermistor 14f is surface mounted on the flexible heating circuit on two isolated copper foil pads 14e. Thermistor 14f is thus mounted directly on the flexible heating circuit by epoxy adhesive. The two lead wires 14d are also adhered with epoxy to thermistor pads 14e, the control wires extending to a control circuit that is explained below. The power wires 14c are secured to eyelets 14g on the heating circuit, also using epoxy adhesive. The epoxy adhesive may be electrically conductive. They may also be soldered. Of course, while the connections here are described as adhesively bonded, they could instead be made by crimping, brazing, welding, wave soldering, or any other convenient way of assembling the circuit.

Other embodiments may use other flexible circuits, such as those using copper heating traces sandwiched between layers of polyimide film. Another suitable heater example of a heater with a heating element between polyimide film (Kapton®) outer layers corresponds to drawing K0360435XX, Jun. 22, 2007, also from Watlow. These drawings are hereby incorporated by reference, as though they were copied into the figures for this patent and set forth herein with a description. These embodiments may be adhered to the handle grips with a layer of adhesive, such as an acrylic or other pressure-sensitive adhesive. Other suitable adhesives may also be used.

Figure 7:
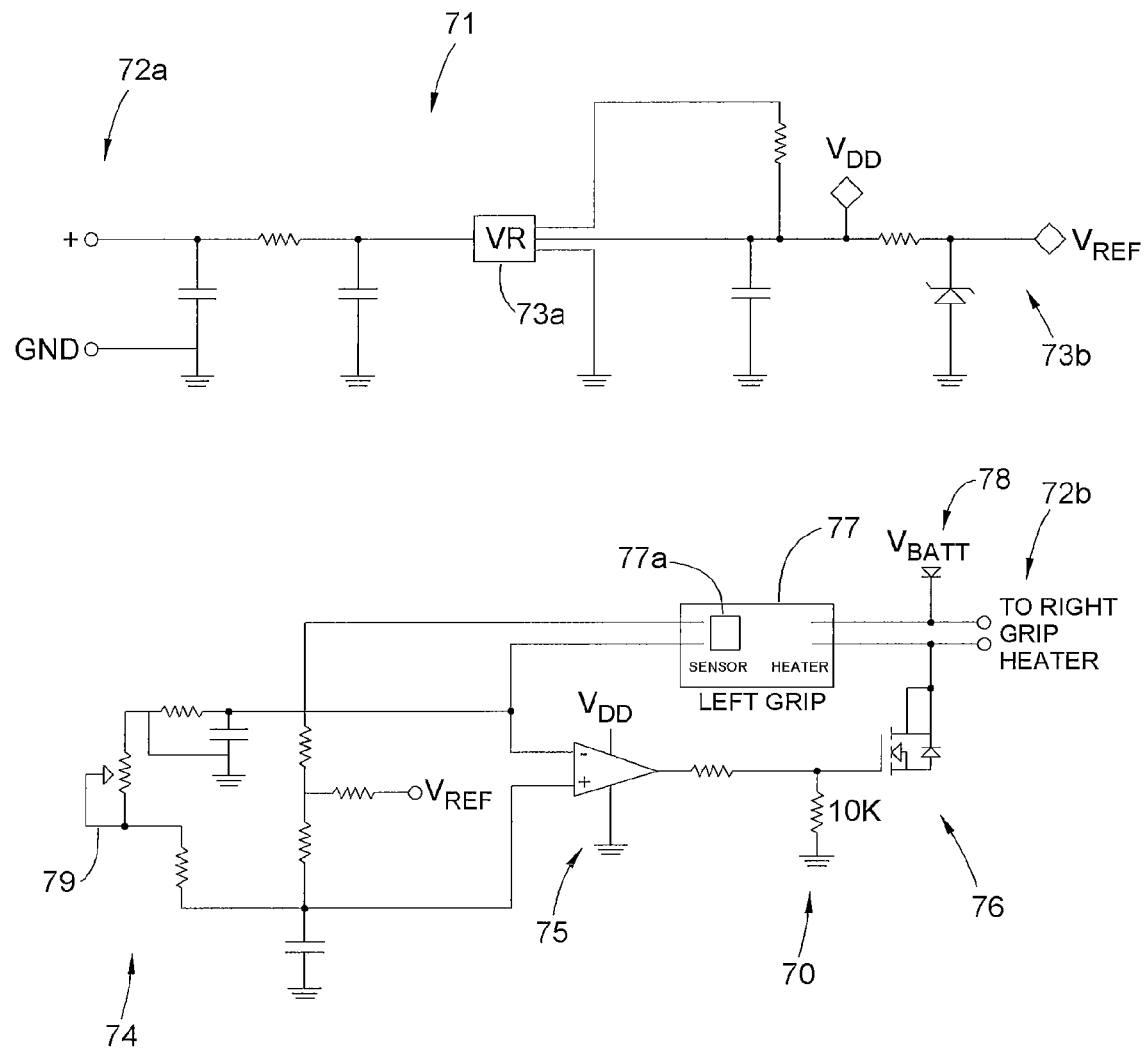
FIG. 7 discloses an electrical schematic of a heating control system useful in embodiments.

A control circuit 70 suitable for the hand grips is disclosed in FIG. 7. This circuit has the principal advantage of using simple circuitry that is relatively immune from shocks and jolts. The circuit does not use a programmable controller, using instead a simple op-amp type comparator. There is no need to complicate what should be a fairly simple circuit, controlling only hand grip temperature and taking into account a set point desired by the user. Using a comparator and appropriate power circuitry, a voltage regulator and a MOSFET power switch, the design and the manufacturing are kept simple, and the cost is kept low. Other low-cost, high-reliability analog type circuits and components may also be used.

Control circuit 70 includes a power regulation circuit portion 71 and a heating control circuit portion 74. In the power regulation circuit, shown in the upper half of the figure, power from the vehicle accessory system enters at connectors 72a and is regulated to provide power to the control circuits 74 for the system, providing $V_{dd}$ and $V_{ref}$. The circuit is designed for power in from a 12V automotive or motorcycle battery, with a range from about 9 VDC to about 16 VDC. The power circuit 71 includes a voltage regulator (VR) 73a and a Zener diode 73b. The VR provides a stable voltage to the control circuit for normal operation with input voltages from 9VDC through 16VDC. The VR also provides protection from reverse voltages and battery jump starts. During line transients, such as a load dump, the voltage can reach 60V. One example of a good VR is LM2931C from National Semiconductor, Santa Clara, Calif., U.S.A. In these situations, when the input voltage to the VR momentarily exceeds the specified maximum operating voltage, the VR will automatically shut down to protect both internal circuits and the load.

In the heating control circuit, comparator 75 is provided with $V_{dd}$ and a 10K pull-up resistor as shown. The voltages at the inverting and non-inverting terminals of the op-amp comparator 75 are set by the position of the control knob potentiometer 79 and the resistance from the temperature sensor 77a on the heating pad 77. In one embodiment, the comparator is a National Semiconductor Model LMV331V7. The output of the heating circuit is provided by $V_{batt}$ 78 from the vehicle battery through a MOSFET power switch 76. One suitable MOSFET switch is IRFL024N from International Rectifier, El Segundo, Calif., U.S.A. Other components may be used, as is well known to those having skill in the art.

A comparator functions by comparing the voltage at the non-inverting input (+) to the voltage at the inventing input (−). If the voltage at the non-inverting input is less than the voltage at the inverting input, the output voltage of the comparator at pin 4 is at the saturation voltage, and power MOSFET 76 remains off. If the voltage at the non-inverting input is greater than voltage at the inverting input, the output voltage of the comparator switches to about 5 VDC. When 5VDC appears on the output of the comparator, and at the gate of MOSFET 76, the circuit shown is sufficient to turn on the MOSFET. Power from the vehicle battery, $V_{batt}$, then flows to the heater contacts as shown at 77, for the left hand grip, and is output through connectors 72b to the heating circuit on the right hand grip. Other equivalent parts may be used in place of the ones herein specified.

Figure 8:
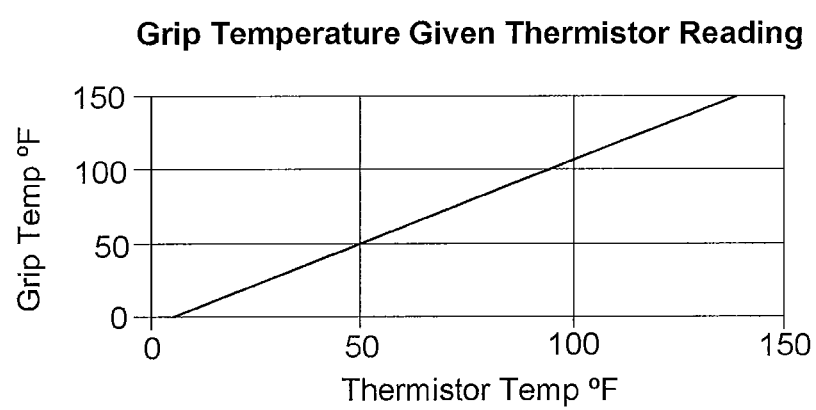
FIG. 8 discloses and graphs the performance of the heated hand grips.

The temperature control observed with the heating circuit described in FIG. 7 above has been excellent. Testing was conducted and the results are depicted in FIG. 8. In FIG. 8, the thermistor temperature is plotted on the X-axis or ordinate, and the hand grip temperature is plotted on the Y-axis, or abscissa. The hand grip temperature was measured by a series of thermocouples attached to the hand grip. Recall that the thermistor is mounted directly on the heating pad, but not connected electrically to the heating traces. Agreement between the thermistor reading and the handgrip reading was excellent in this testing.

It should be understood that various changes and modifications to the presently preferred embodiments described herein will be apparent to those skilled in the art. For example, the inner housing and the bezel are made as separate parts because the heated hand grip is more easily assembled using that configuration. However, it is certainly possible to incorporate the features of the bezel into the head of the inner housing. The entire unit could be assembled and then placed onto the motorcycle for completion of the wiring and application of the control knob. As noted above, the housing need not be an enclosure, only a mount for the circuit board and a support for the wiring. Such a simplified housing would easily accommodate the features of the bezel and allow for yet lower costs. Many other small and insubstantial changes are also possible. Such changes and modifications can be made without departing from the spirit and scope of the present subject matter and without diminishing its intended advantages. It is therefore intended that such changes and modifications be covered by the appended claims.

What is claimed is:

1. A heated hand grip, comprising:
   an inner housing having a mounting aperture, an outer side pocket comprising a recess configured to hold control wires and an interface;
   a printed circuit board for mounting within the inner housing and including a potentiometer for mounting in the mounting aperture and directly to the printed circuit board;
   a bezel configured for mounting to a handlebar and also configured for mounting to the inner housing;
   a control knob for mounting to the bezel;
   a resistive heating element for at least one hand grip operatively connected to the printed circuit board; and
   a control circuit mounted on the printed circuit board for controlling power to the resistive heating element.

2. The heated hand grip according to claim 1, further comprising a detent that provides tactile feedback to a user when the control knob is rotated.

3. The heated hand grip according to claim 1, wherein the resistive heating element comprises heating element traces mounted on a non-conductive thin polymer film or reinforced non-conductive polymer composite forming a heating pad, the heating pad mounted within the hand grip.

4. The heated hand grip according to claim 1, further comprising a temperature sensor mounted adjacent the resistive heating element.

5. The heated hand grip according to claim 1, further comprising a tortuous path for ingress of moisture formed by the control knob, the bezel and the inner housing, and by at least two seals between the control knob and the bezel and between the bezel and the housing.

6. The heated hand grip according to claim 1, further comprising a shock-absorbing layer between the printed circuit board and the inner housing.

7. A heated hand grip, comprising:
   an inner housing having a mounting aperture, an outer side pocket comprising a recess configured to hold control wires and an interface;
   a printed circuit board for mounting within the inner housing, the circuit board further comprising a potentiometer for controlling a heat setting for the hand grip, the potentiometer mounted in the mounting aperture and also mounted directly to the circuit board;
   a bezel configured for mounting to a handlebar and also configured for mounting to the inner housing;
   a control knob for mounting to the bezel, wherein the bezel and the knob further comprise a detent mounted for providing a tactile feedback to a user when the control knob is rotated;
   a resistive heating element mounted to at least one hand grip and operatively connected to the printed circuit board; and
   a control circuit mounted on the printed circuit board for controlling power to the resistive heating element.

8. The heated hand grip according to claim 7, wherein the detent comprises at least one roller and one spring.

9. The heated hand grip according to claim 8, wherein the detent comprises a leaf spring with a bend or a roller on one of the bezel and the knob and an interface for the bend or the roller on the other of the bezel and the knob.

10. The heated hand grip according to claim 7, wherein the control circuit comprises a comparator and two resistive circuits operably connected to the comparator.

11. The heated hand grip according to claim 7, further comprising matching snap fit connectors on the control knob and the bezel.

12. A heated hand grip, comprising:
    an inner housing having a mounting aperture, an interface, an inner shelf and an outer side pocket comprising a recess configured to hold control wires;
    a printed circuit board for mounting within the inner housing on the shelf and including a potentiometer for mounting in the mounting aperture and directly to the printed circuit board;
    a bezel configured for mounting to a handlebar and also configured for mounting to the inner housing;
    a control knob for mounting to the bezel, wherein the bezel and the knob further comprise matching snap-fit connectors;
    a resistive heating element mounted to at least one hand grip and operatively connected to the printed circuit board; and
    a control circuit mounted on the printed circuit board for controlling power to the resistive heating element.

13. The heated hand grip according to claim 12, further comprising a detent for providing tactile feedback to a user, the detent comprising two rollers and springs mounted between the control knob and the bezel.

14. The heated hand grip according to claim 12, wherein the control circuit comprises a comparator circuit that is configured for routing power to the resistive heating element in accordance with a setting on the control knob.

15. The heated hand grip according to claim 12, further comprising a temperature sensor mounted adjacent the resistive heating element, and wherein the control circuit is configured for routing power to the resistive heating element in accordance with a setting on the control knob and a temperature of the temperature sensor.

16. A heated hand grip, comprising:

an inner housing having a mounting aperture, an outer side pocket comprising a recess configured to hold wires, and an interface;

a printed circuit board for mounting within the housing, the printed circuit board including a potentiometer for mounting in the mounting aperture and directly to the printed circuit board;

a bezel configured for mounting to a handlebar and also configured for mounting to the inner housing;

a control knob for mounting to the bezel, wherein the bezel and the knob further comprise a detent mounted for providing a tactile feedback to a user;

a resistive heating element mounted to at least one hand grip and operatively connected to the printed circuit board; and a control circuit mounted on the printed circuit board for controlling power to the resistive heating element, the control circuit including a temperature sensor mounted between heating element traces of the resistive heating element, wherein the control knob, the bezel and the inner housing further comprise mounts for a first seal and a second seal, a first mount adjacent the control knob and the bezel and a second mount adjacent the bezel and the inner housing, wherein the control knob, the first seal, the bezel, the second seal and the inner housing form a tortuous path for moisture ingress.

17. The heated hand grip according to claim 16, wherein the first mount and second mount comprise grooves on the bezel.

18. The heated hand grip according to claim 16, wherein the mounts comprise grooves on at least one of the control knob, the bezel and the inner housing.

19. A method of heating a hand grip, the method comprising:

providing a heating pad that comprises heating element traces mounted on a non-conductive thin polymer film, the heating pad mounted within the hand grip;

connecting the heating pad to a control circuit, the control circuit including a circuit board and a potentiometer for controlling a heat setting for the hand grip, the potentiometer mounted directly to the circuit board and also mounted in an aperture of an inner housing of the hand grip, the inner housing comprising a recess configured to hold wires leading to and controlling the heating pad;

connecting a temperature sensor to the control circuit by mounting the temperature sensor between the heating element traces;

heating the heating pad with the control circuit; and regulating a flow of power to the heating pad using the temperature sensor.

20. The method of claim 19, further comprising controlling a flow of power to the heating pad using a control knob and bezel on the hand grip, the control knob and bezel further comprising a detent for providing tactile feed back to a user.

21. The method of claim 19, further comprising placing a thin, soft, shock absorbing material between the printed circuit board including the control circuit and the inner housing supporting the printed circuit board.

22. The method of claim 19, further comprising mounting the control circuit within the inner housing having the mounting aperture for the potentiometer near one end of the inner housing and an interface for a bezel on a same end of the inner housing.

23. The heated hand grip according to claim 1, further comprising a detent that provides tactile feedback comprises two rollers and two springs between the bezel and the control knob.

24. The heated hand grip according to claim 1, further comprising a detent that provides tactile feedback comprises two points of contact between the bezel and the control knob.

* * * * *